(12) United States Patent
Nilsson Gatenholm

(10) Patent No.: US 11,548,342 B2
(45) Date of Patent: Jan. 10, 2023

(54) COILOVER SHOCK ABSORBER

(71) Applicant: Ningbo Geely Automobile Research & Development Co., Ltd., Ningbo (CN)

(72) Inventor: Magnus Nilsson Gatenholm, Särö (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 214 days.

(21) Appl. No.: 16/888,767

(22) Filed: May 31, 2020

(65) Prior Publication Data
US 2020/0290421 A1 Sep. 17, 2020

Related U.S. Application Data

(63) Continuation of application No. PCT/CN2018/118849, filed on Dec. 3, 2018.

(30) Foreign Application Priority Data

Dec. 7, 2017 (EP) ..................... 17205962

(51) Int. Cl.
| | |
|---|---|
| *B60G 15/06* | (2006.01) |
| *B60G 17/02* | (2006.01) |
| *F16F 9/32* | (2006.01) |

(52) U.S. Cl.
CPC ......... *B60G 15/063* (2013.01); *B60G 15/067* (2013.01); *B60G 2202/312* (2013.01);
(Continued)

(58) Field of Classification Search
CPC ............... B60G 15/063; B60G 15/067; B60G 2202/312; B60G 2204/1242;
(Continued)

(56) References Cited

U.S. PATENT DOCUMENTS 1,677,714 A * 7/1928 Frease ..................... E04C 3/32
74/552
2,660,449 A * 11/1953 Macpherson ............ B60G 3/18
280/124.152
(Continued)

FOREIGN PATENT DOCUMENTS

| CN | 2158801 Y | 3/1994 |
|---|---|---|
| CN | 201991990 U | 9/2011 |

(Continued)

OTHER PUBLICATIONS

International Search Report from corresponding International Application No. PCT/CN2018/118849, dated Feb. 28, 2019, 5 pages.
(Continued)

*Primary Examiner* — Robert A. Siconolfi
*Assistant Examiner* — James K Hsiao
(74) *Attorney, Agent, or Firm* — Tucker Ellis LLP

(57) ABSTRACT

A coilover shock absorber includes a damper element and a coil spring, where the coilover shock absorber includes a first mount for the damper element and a second mount for the damper element, and where the coilover shock absorber includes a first seat for the coil spring and a second seat for the coil spring, where the first mount for the damper element is operatively separate from the first seat for the coil spring, where the second mount for the damper element is operatively separate from the second seat for the coil spring. The resulting inverted coilover shock absorber allows for separate load paths for the damper element and the coil spring to the chassis.

23 Claims, 3 Drawing Sheets

(52) U.S. Cl.
CPC .. *B60G 2204/128* (2013.01); *B60G 2204/129* (2013.01); *B60G 2204/1242* (2013.01); *B60G 2204/41* (2013.01)

(58) Field of Classification Search
CPC ........ B60G 2204/129; B60G 2204/128; B60G 2204/41; B60G 17/08; B60G 17/06; B60G 17/027; F16F 9/32; F16F 9/56
See application file for complete search history.

(56) References Cited

U.S. PATENT DOCUMENTS

| | | | | |
|---|---|---|---|---|
| 2,972,489 | A * | 2/1961 | Collier | B60G 17/025 |
| | | | | 280/124.152 |
| 3,165,306 | A | 1/1965 | Tea | |
| 3,193,304 | A * | 7/1965 | Behlke | B60G 17/021 |
| | | | | 267/222 |
| 3,491,845 | A * | 1/1970 | Allison | B60G 21/073 |
| | | | | 267/64.11 |
| 3,589,701 | A * | 6/1971 | Gee | F16F 9/363 |
| | | | | 267/64.15 |
| 4,489,954 | A * | 12/1984 | Yasui | B62M 27/02 |
| | | | | 280/21.1 |
| 4,648,623 | A * | 3/1987 | Cameron | B60G 15/14 |
| | | | | 280/86.754 |
| 4,685,888 | A * | 8/1987 | Brewer | B63H 20/36 |
| | | | | 248/642 |
| 4,690,428 | A * | 9/1987 | Fluegge | B60G 11/16 |
| | | | | 280/124.141 |
| 5,308,104 | A * | 5/1994 | Charles | F16F 9/58 |
| | | | | 280/124.155 |
| 5,421,565 | A | 6/1995 | Harkrader et al. | |
| 5,775,720 | A * | 7/1998 | Kmiec | F16F 9/58 |
| | | | | 267/64.15 |
| 6,179,309 | B1 * | 1/2001 | Satou | B60G 3/20 |
| | | | | 280/124.179 |
| 8,434,772 | B2 * | 5/2013 | Keil | F16F 9/3235 |
| | | | | 188/315 |
| 9,004,470 | B2 * | 4/2015 | Fleniken | F16F 9/58 |
| | | | | 267/220 |
| 9,108,484 | B2 * | 8/2015 | Reybrouck | B60G 15/063 |
| 9,186,948 | B2 * | 11/2015 | Patil | B60G 11/22 |
| 10,399,402 | B2 * | 9/2019 | Prevot | B60G 3/01 |
| 2008/0197596 | A1 * | 8/2008 | Heeren | B60G 13/006 |
| | | | | 280/124.1 |
| 2010/0213656 | A1 * | 8/2010 | Patil | F16F 9/58 |
| | | | | 188/372 |
| 2012/0181127 | A1 * | 7/2012 | Keil | F16F 9/3235 |
| | | | | 188/297 |
| 2014/0252707 | A1 | 9/2014 | Fleniken | |

FOREIGN PATENT DOCUMENTS

| | | |
|---|---|---|
| CN | 206299742 U | 7/2017 |
| DE | 1774398 U | 9/1958 |
| DE | 7613092 U1 | 10/1976 |
| FR | 1394137 A | 4/1965 |
| JP | 2005299786 A | 10/2005 |
| WO | 17018368 A1 | 2/2017 |

OTHER PUBLICATIONS

Extended European Search Report from corresponding European Application No. 17205962.8, dated Jun. 12, 2018, 7 pages.

* cited by examiner

COILOVER SHOCK ABSORBER

RELATED APPLICATION DATA

This application is a continuation of International Application No. PCT/CN2018/118849, filed Dec. 3, 2018, which claims the benefit of European Application No. 17205962.8, filed Dec. 7, 2017, the disclosures of which are incorporated herein by reference in their entireties.

TECHNICAL FIELD

The present invention relates to a shock absorber of the coilover type for a vehicle, where the damper element and the spring element are mounted to the chassis through different resilient bushings.

BACKGROUND ART

Vehicles use spring elements and damper elements to reduce the effect on the vehicle when traveling over rough ground, leading to improved ride quality and vehicle handling. Shock absorbers are used to limit excessive suspension movements of the vehicle by damping spring oscillations. Springs are used for the suspension of the chassis of the vehicle, between the chassis of the vehicle and the linkages that connects a vehicle to its wheels. The springs allow relative motion between the wheels and the chassis. The damper element and the spring element work in parallel, where the spring allows the movement of the chassis and the damper absorbs the motion energy of the un-sprung weight of the chassis such that oscillations are avoided.

Shock absorbers are often hydraulic and the spring element is often a coil spring which may be arranged around the shock absorber. Such a solution is referred to as a coilover shock absorber, which is short for "coil spring over shock absorber". The coilover shock absorber may be manufactured as a single unit, wherein the damper element and the coil spring are integrated as one unit. One advantage of such a unit is that the space requirements can be minimized when compared with a separate damper element and a free-standing coil spring.

A coilover shock absorber is often arranged with the damper cylinder of the damper element attached to the wheel side of the wheel suspension, and with the piston attached to the chassis side of the wheel suspension. The damper element and the coil spring are arranged to substantially extend in the same direction, and the coil spring is mounted around the piston, with the lower spring seat attached to the damper cylinder and with the upper spring seat attached to the chassis side of the wheel suspension. In order to fine tune the suspension, it is possible to attach the piston to the chassis through a first resilient bushing, and to attach the coil spring to the chassis through a second resilient bushing. The first resilient bushing and the second resilient bushing are separate, such that the properties of the first resilient bushing and the second resilient bushing can be selected independently. The load generated by the damper and the load generated by the spring are thus separated. This allows for a fine tuning of the suspension.

The diameter of the coil spring is greater than the diameter of the damper cylinder. The larger part of the coilover shock absorber will thus be positioned at the upper end of the wheel suspension. For packing reasons, it may sometimes be of advantage to install the coilover shock absorber in an inverted direction, with the larger part, having the largest diameter, of the coilover shock absorber at the lower end of the wheel suspension. Since the lower spring seat is attached to the damper cylinder, an inverted mounting of the coilover shock absorber will not allow a separation of the load path of the damper and the load path of the coil spring to the chassis.

WO17018368A1 discloses a shock absorber having an upper damper cylinder. The lower spring seat is in common with the lower shock absorber mount. The upper spring seat is arranged to the upper cylinder by an auxiliary spring and damper arrangement interposed between the upper spring seat and a piston, which provides an additional damper between the spring and the cylinder. This solution may work for some cases, but is relatively complicated and is difficult to fine tune.

There is thus room for an improved coilover shock absorber for a vehicle.

DISCLOSURE OF INVENTION

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An object of the invention is therefore to provide an improved coilover shock absorber for a vehicle. A further object of the invention is to provide a vehicle comprising such a coilover shock absorber.

The solution to the problem according to the invention is described in the appended claims along with other advantageous further developments of the inventive coilover shock absorber and the vehicle.

In a coilover shock absorber comprising a damper element and a coil spring, where the coilover shock absorber comprises a first mount for the damper element and a second mount for the damper element, and where the coilover shock absorber comprises a first seat for the coil spring and a second seat for the coil spring, and where the first mount for the damper element is operatively separate from the first seat for the coil spring, the object of the invention is achieved in that the second mount for the damper element is operatively separate from the second seat for the coil spring.

By this first embodiment of a coilover shock absorber according to the invention, a coilover shock absorber which allows different load paths for the coil spring and the damper element to the chassis is provided. In this way, it is possible to use one type of isolator bushing when mounting the damper element to the chassis, and another type of isolator bushing having different properties when mounting the coil spring to the chassis. It is thus possible to fine tune the noise, vibration and harshness (NVH) performance of the suspension system of the vehicle.

The coilover shock absorber has a substantial longitudinal shape where the coilover shock absorber is provided with a first mount provided at one end of the damper element and with a second mount provided at the other, opposite end of the damper element, where the first mount and the second mount are arranged along the longitudinal axis of the coilover shock absorber. The coilover shock absorber is further provided with a first seat for one end of the coil spring, where the first seat is arranged at the first mount of the damper element, and with a second seat arranged at the other, opposite end of the coil spring. The first seat and the second seat are arranged around the longitudinal axis of the coilover shock absorber.

In a development of the invention, the coilover shock absorber comprises an elongated spring seat for the second seat of the coil spring. This will allow the coil spring to be positioned at one end of the coilover shock absorber, such that the diameter of the coilover shock absorber will be smaller at the other end of the coilover shock absorber. This may be advantageous in e.g. different packing situations.

The elongated springseat is arranged around the damper cylinder of the damper element, and will preferably extend over at least half of the length of the damper cylinder. Stabilizing elements are arranged between the damper cylinder and the elongated springseat, such that the elongated springseat can move independently from the damper cylinder. The stabilizing elements are provided with a low axial stiffness in order to minimize load transfer between the elongated springseat and the damper cylinder. The size and shape of the elongated springseat may vary, but the main purpose of the elongated springseat is to provide an independent seat for the coil spring, which is arranged spaced apart from the second mount of the damper element, but that still can be mounted to the chassis with a separate bushing at the same position as the second mount.

According to an aspect a coilover shock absorber comprise a damper element, a coil spring, a first mount for the damper element, a second mount for the damper element, a first seat for the coil spring and a second seat for the coil spring, wherein the first mount for the damper element is positioned at the first seat for the coil spring and is operatively separate from the first seat for the coil spring, wherein the second mount for the damper element is positioned at a distance from the second seat for the coil spring and is operatively separate from the second seat for the coil spring, wherein the damper element comprises a damper cylinder and a piston, where the second mount for the damper element is arranged on the damper cylinder and where the first mount for the damper element is arranged on the piston, wherein the second seat for the coil spring is arranged on an elongated springseat having a first end, a body and a second end, and wherein the first end of the elongated springseat is connected to the second seat and the second end of the elongated springseat is positioned at the second mount.

In this way, it is possible to use one type of damper element with different lengths and another type of coil spring having different properties and lengths when mounting the coilover shock absorber to the chassis and at the same time let the seat and mount be operatively separate from each other. By operatively separate is meant that the coil spring and the damper element can independently transfer forces between the ends of the coilover shock absorber. Put in another way, the forces from the coil spring does not have to be transferred by the damper element, or the opposite. It is thus possible to fine tune the noise, vibration and harshness (NVH) performance of the suspension system of the vehicle According to an aspect the body of the elongated springseat is circular.

According to an aspect the body of the elongated springseat is tubular.

According to an aspect the body of the elongated springseat is hollow.

According to an aspect the body of the elongated springseat is ring shaped.

According to an aspect the body of the elongated springseat is symmetric in its elongation between the first and second end.

According to an aspect the body encloses at least a part of the damper cylinder. According to an aspect the body is arranged outside at least a part of the damper cylinder. According to an aspect the body of the elongated springseat is symmetrically mounted around the damper cylinder.

According to an aspect the body is configured to evenly transfer forces from the coil spring to the second end of the elongated body. By evenly transfer forces is meant that the forces is transferred in a way that reduces/limits the occurrence of shearing forces on the coilover shock absorber.

According to an aspect the length of the elongated springseat is at least half of the length of the damper cylinder.

According to an aspect the coilover shock absorber comprises at least one stabilizing element arranged between the elongated springseat and the damper cylinder.

According to an aspect the diameter of the first end of the elongated springseat is larger than the diameter of the body of the elongated springseat.

According to an aspect the first mount for the damper element and the first seat for the coil spring are configured to be mounted to an un-sprung part of a wheel suspension of a vehicle.

According to an aspect the second mount for the damper element and the second seat for the coil spring are mounted to an un-sprung part of a wheel suspension of the vehicle.

The coilover shock absorber is arranged between an un-sprung part of the wheel suspension and the chassis of a vehicle. By using different isolation bushings when mounting the damper element and the coil spring to the chassis, fine tuning of the suspension performance is possible. Fine tuning the damper properties and the spring properties will improve the ride comfort and the NVH performance of the vehicle.

BRIEF DESCRIPTION OF DRAWINGS

The invention will be described in greater detail in the following, with reference to the attached drawings, in which.

MODES FOR CARRYING OUT THE INVENTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

The embodiments of the invention with further developments described in the following are to be regarded only as examples and are in no way to limit the scope of the protection provided by the patent claims.

Figure 1:
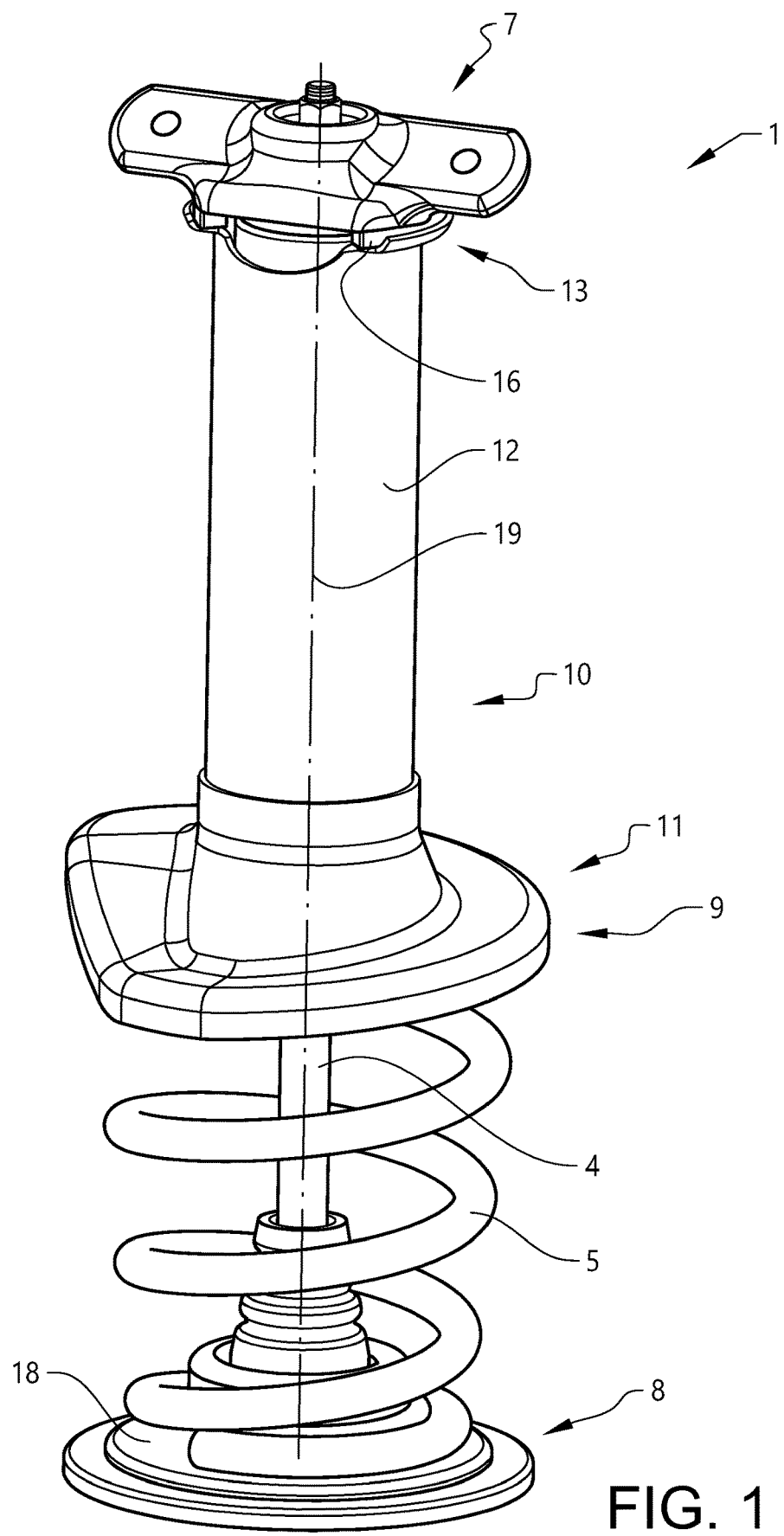
FIG. 1 shows a view of a coilover shock absorber according to the invention.
Figure 2:
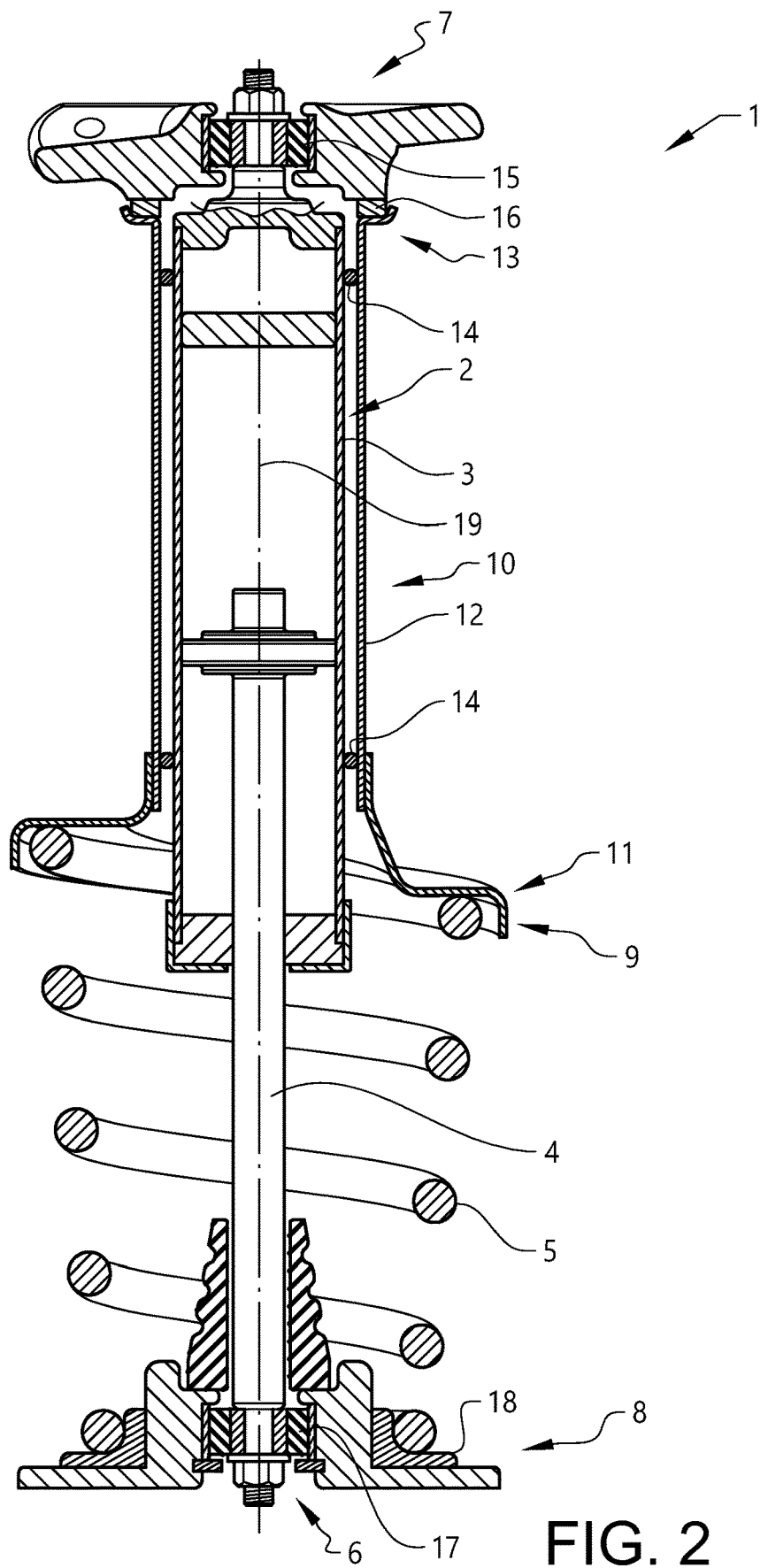
FIG. 2 shows a cut view of a coilover shock absorber according to the invention.

FIGS. 1 and 2 shows an example of a coilover shock absorber 1 which comprises a damper element 2 and a coil spring 5, where the coil spring is arranged around the damper element. The damper element comprises a damper cylinder 3 and a piston 4. The damper element 2 is preferably a conventional pneumatic or hydraulic shock absorber, e.g. of a mono-tube type, used to absorb and damp shock impulses imposed on the vehicle. The coil spring 5 is a conventional coil spring used to store the energy of the imposed shock impulse on the vehicle.

The coilover shock absorber 1 comprises a first mount 6 for the damper element 2 and a second mount 7 for the damper element 2. The first mount 6 is arranged on the piston 4 and is adapted to be mounted to a part of the vehicle through a third bushing 17. The second mount 7 is arranged on the damper cylinder 3 and is adapted to be mounted to a part of the vehicle through a first bushing 15. The first mount and the second mount are arranged at each end of the damper element, and are arranged along the central axis 19 of the coilover shock absorber. In a first example of the coilover shock absorber, the first mount 6 is adapted to be mounted to a link arm of a vehicle, which is part of the un-sprung weight of the wheel suspension. The second mount is adapted to be mounted to the chassis of the vehicle, which is the sprung part of the vehicle.

The coilover shock absorber 1 further comprises a first seat 8 for the coil spring 5 and a second seat 9 for the coil spring 5. The first seat 8 is adapted to be mounted to a part of the vehicle through a fourth bushing 18. The second seat 9 is adapted to be mounted to a part of the vehicle through a second bushing 16. The first seat for the coil spring is arranged at the first mount for the damper element. In a first example of the coilover shock absorber, the second seat 9 is adapted to be mounted to the chassis of the vehicle, which is the sprung part of the vehicle. The first seat 8 is adapted to be mounted to a link arm of a vehicle, which is part of the un-sprung weight of the wheel suspension.

In the first example, the third bushing may be replaced with a ball-joint and the fourth bushing may be deleted, since the attachment of the coilover shock absorber to the un-sprung part of the wheel suspension does not influence the ride comfort of the vehicle. Bushings may be used in order to reduce noise or wear, but will not influence the noise, vibration and harshness (NVH) performance of the vehicle.

The coilover shock absorber preferably comprises an elongated springseat 10. The elongated springseat is circular and is arranged around the damper cylinder 3 of the damper element 2. The length of the elongated springseat 10 is preferably at least half of the length of the damper cylinder. The length and dimensions of the elongated springseat is partly depending on the packing situation of the coilover shock absorber in the vehicle. By using an elongated springseat, the diameter of the coilover shock absorber can be reduced at the position of the elongated springseat. The elongated springseat 10 comprises a first end 11, a circular body 12 and a second end 13. The first end 11 comprises the second seat 9 for the coil spring 5. The second end 13 is adapted to be positioned at the first mount 7 of the damper element 2, and is adapted to be mounted to a part of the vehicle through the second resilient bushing 16. The elongated springseat is preferably made from a metal, but a fibre reinforced composite material is also possible to use.

The coilover shock absorber comprises a number of stabilizing elements 14 arranged between the outer surface of the damper cylinder 3 and the inner surface of the elongated springseat 10. The stabilizing elements are adapted to secure the position between the damper cylinder and the elongated springseat, and are preferably provided with low axial stiffness in order to minimize load transfer between the damper cylinder and the elongated springseat. The stabilizing elements may be made from plastic or rubber and the gliding surfaces are preferably treated with a low friction treatment. It is also possible to provide the gliding surfaces with a pattern in order to reduce friction.

The coilover shock absorber may be used in a rear wheel suspension of a vehicle or in a front wheel suspension of a vehicle. In a first example of the coilover shock absorber mounted to a vehicle, shown in FIG. 3, the coilover shock absorber is arranged at the rear wheel suspension 31 of a vehicle 30.

The coilover shock absorber is mounted to a vehicle 30 with the second mount 7 and the second end 13 of the elongated springseat 10 pointing upwards, where the second mount 7 and the second end 13 are mounted to the chassis 33 of the vehicle 30. The second mount 7 is mounted to the chassis through a first resilient bushing 15 and the second end 13 is mounted to the chassis through a second resilient bushing 16. The first mount 6 and the first seat 8 are mounted to an un-sprung part of the rear wheel suspension 31, e.g. to a link arm 32 which is part of the un-sprung weight of the rear wheel suspension 31 of the vehicle. The first mount 6 and the first seat 8 may be mounted to the link arm through a third bushing or ball-joint 17 and a fourth bushing 18, respectively. One or both bushings may be omitted. The resilient properties of the first bushing and the second bushing are preferably selected independently from each other. In this way, it is possible to fine tune the relation between the damper element and the coil spring. The damper element and the coil spring will in this way be provided with separate load paths, which allows for an independent fine tuning of the coilover shock absorber. One load path will be from the link arm though the coil spring, through the elongated springseat and through the second bushing to the chassis. The other load path will be from the link arm through the damper element and through the first bushing to the chassis. If a third bushing and a fourth bushing are used, they will also be included in the load paths.

According to an aspect the coilover shock absorber 1 comprise a damper element 2, a coil spring 5, a first mount 6 for the damper element 2, a second mount 7 for the damper element 2, a first seat 8 for the coil spring 5 and a second seat 9 for the coil spring 5, wherein the first mount 6 for the damper element 2 is positioned at the first seat 8 for the coil spring 5 and is operatively separate from the first seat 8 for the coil spring 5, wherein the second mount 7 for the damper element 2 is positioned at a distance from the second seat 9 for the coil spring and is operatively separate from the second seat 9 for the coil spring 5, wherein the damper element 2 comprises a damper cylinder 3 and a piston 4, where the second mount 7 for the damper element 2 is arranged on the damper cylinder 3 and where the first mount 6 for the damper element 2 is arranged on the piston 4, wherein the second seat 9 for the coil spring 5 is arranged on an elongated springseat 10 having a first end 11, a body 12 and a second end 13, and wherein the first end 11 of the elongated springseat 10 is connected to the second seat 9 and the second end 13 of the elongated springseat 10 is positioned at the second mount 7.

By this aspect of a coilover shock absorber according to the invention, a coilover shock absorber which allows different load paths for the coil spring and the damper element to the chassis is provided. In this way, it is possible to use one type of isolator bushing when mounting the damper element to the chassis, and another type of isolator bushing having different properties when mounting the coil spring to the chassis. It is thus possible to fine tune the noise, vibration and harshness (NVH) performance of the suspension system of the vehicle.

In this way, it is possible to use one type of damper element 2 with different lengths and another type of coil spring 5 having different properties and lengths when mounting the coilover shock absorber 1 to the chassis and at the same time let the seat and mount be operatively separate from each other. By operatively separate is meant that the coil spring 5 and the damper element 2 can independently transfer forces between the ends of the coilover shock absorber. Put in another way, the forces from the coil spring 5 does not have to be transferred by the damper element 2, or the opposite. It is thus possible to fine-tune the noise, vibration and harshness (NVH) performance of the suspension system of the vehicle.

According to an aspect the distance that the second mount 7 for the damper element 2 is positioned from the second seat 9 for the coil spring is dependent on the difference in length of the coil spring 5 and a length of the damper element 2. According to an aspect the distance that the second mount 7 for the damper element 2 is positioned from the second seat 9 for the coil spring 5 corresponds to a length of the elongated springseat 10.

According to an aspect the body 12 of the elongated springseat 10 is circular. According to an aspect the body 12 of the elongated springseat 10 is tubular. According to an aspect the body 12 of the elongated springseat 10 is hollow. According to an aspect the body 12 of the elongated springseat 10 is ring shaped. According to an aspect the body 12 of the elongated springseat 10 is symmetric in its elongation between the first and second end 11, 13.

According to an aspect the body 12 encloses at least a part of the damper cylinder 3. According to an aspect the body 12 is arranged outside at least a part of the damper cylinder 3. According to an aspect the body 12 of the elongated springseat 10 is symmetrically mounted around the damper cylinder 3.

According to an aspect the body 12 is configured to evenly transfer forces from the coil spring 5 to the second end 13 of the elongated body 10. By evenly transfer forces is meant that the forces is transferred in a way that reduces the occurrence of shearing forces on the coilover shock absorber 1. One way of doing this is by the body 12 having a shape in accordance with any of the aspects above, i.e. that the body has a shape that is circular, tubular, hollow, ring shaped, symmetric in its elongation between the first and second end 11, 13 or any combination thereof According to an aspect the length of the elongated springseat 10 is at least half of the length of the damper cylinder 3.

According to an aspect the coilover shock absorber 1 comprises at least one stabilizing element 14 arranged between the elongated springseat 10 and the damper cylinder 3.

According to an aspect the diameter of the first end 11 of the elongated springseat 10 is larger than the diameter of the body 12 of the elongated springseat 10.

According to an aspect the first mount 6 for the damper element 2 and the first seat 8 for the coil spring 5 are configured to be mounted to an un-sprung part of a wheel suspension 31 of a vehicle.

According to an aspect the second mount 7 for the damper element 2 and the second seat 9 for the coil spring 5 are mounted to an un-sprung part of a wheel suspension 31 of the vehicle.

Figure 3:
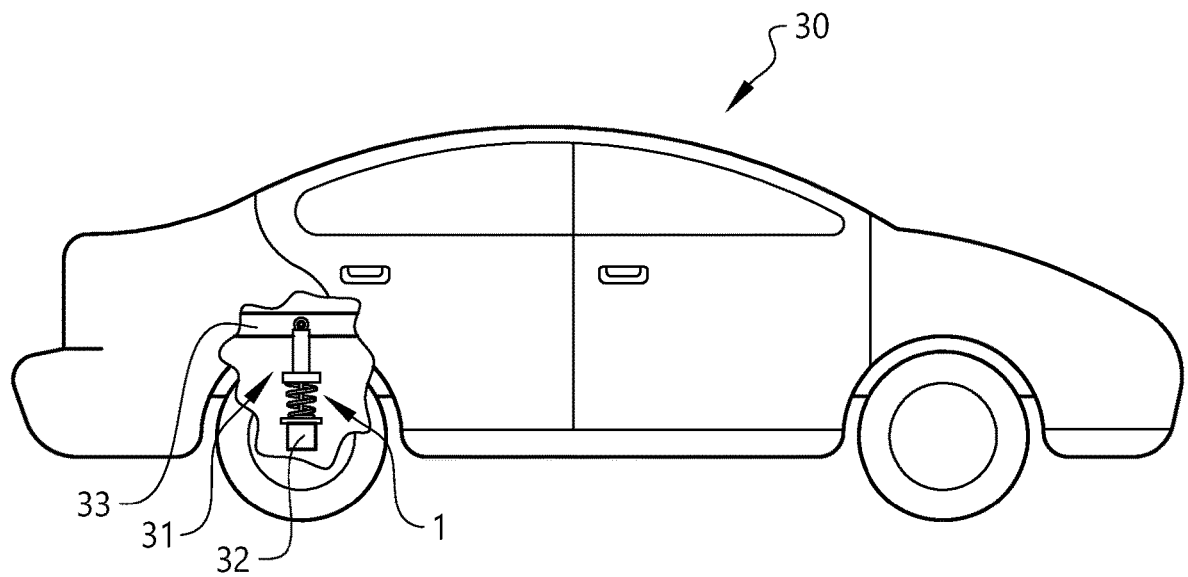
FIG. 3 shows a first example of a vehicle comprising a coilover shock absorber according to the invention.
Figure 4:
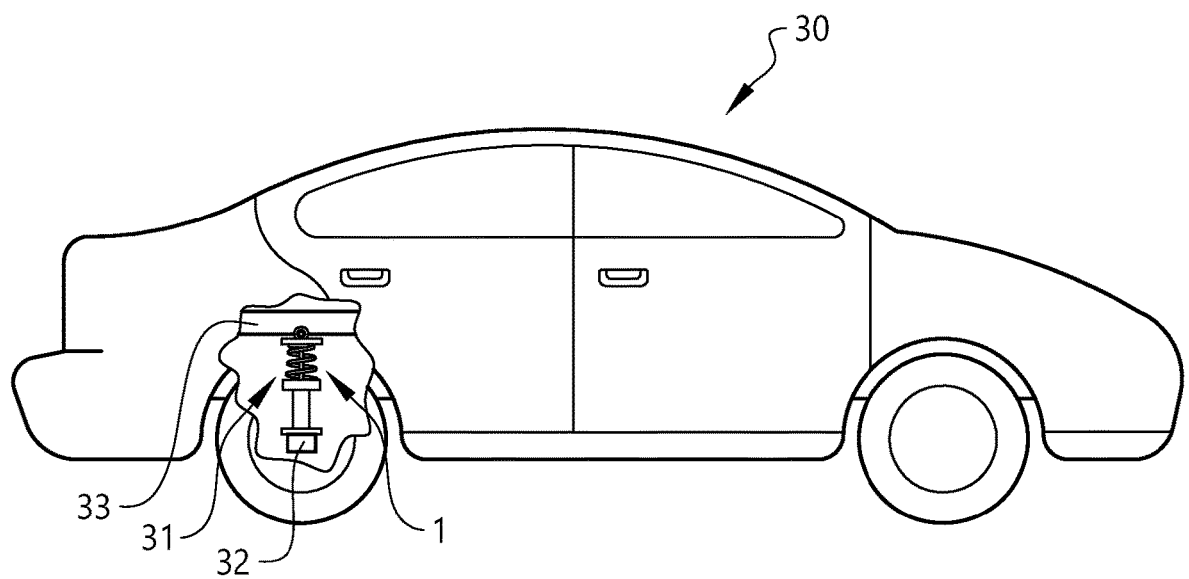
FIG. 4 shows a second example of a vehicle comprising a coilover shock absorber according to the invention.

In a second example of the coilover shock absorber mounted to a vehicle, shown in FIG. 4, the coilover shock absorber is mounted upside down when compared to the example as shown in FIG. 3. The coilover shock absorber is mounted to the vehicle 30 with the first mount 6 and the first seat 8 pointing upwards, where the first mount 6 and the first seat 8 are mounted to the chassis 33 of the vehicle 30. The first mount 6 is mounted to the chassis through a third resilient bushing 17 and the first seat 8 is mounted to the chassis through a fourth resilient bushing 18. The second mount 7 and the second end 13 of the elongated springseat 10 are mounted to the link arm 32 which is part of the un-sprung weight of the rear wheel suspension 31 of the vehicle. The second mount 7 and the second end 13 may be mounted to an un-sprung part of the rear wheel suspension 31, e.g. to the link arm through a first bushing 15 and a second bushing 16, respectively. One or both bushings may be omitted. The resilient properties of the third bushing and the fourth bushing are preferably selected independently from each other. In this way, it is possible to fine-tune the relation between the damper element and the coil spring. The damper element and the coil spring will in this way be provided with separate load paths, which allows for an independent fine-tuning of the coilover shock absorber. One load path will be from the link arm through the second bushing, through the elongated springseat, though the coil spring and through the fourth bushing to the chassis. The other load path will be from the link arm through the first bushing, through the damper element and through the third bushing to the chassis.

Different aspects and examples in accordance with the above could be combined with one or more of the other aspects and examples of the above.

The invention is not to be regarded as being limited to the embodiments described above, a number of additional variants and modifications being possible within the scope of the subsequent patent claims.

REFERENCE SIGNS

1: Coilover shock absorber
2: Damper element
3: Damper cylinder
4: Piston
5: Coil spring
6: First mount
7: Second mount
8: First seat
9: Second seat
10: Elongated springseat
11: First end
12: Body 13: Second end
14: Stabilizing element
15: First resilient bushing
16: Second resilient bushing
17: Third resilient bushing
18: Fourth resilient bushing
19: Central axis
30: Vehicle
31: Rear wheel suspension
32: Link arm
33: Chassis

The invention claimed is:

1. A coilover shock absorber comprising:
a damper element having a first damper element mount at a first end of the coilover shock absorber and a second damper element mount at a second end of the coilover shock absorber,
a coil spring having a first end and a second end,
a first vehicle mount at the first end of the coilover shock absorber and configured to attach to a first location of a vehicle, the first vehicle mount physically coupled to the first damper element mount and the first end of the coil spring at separate locations of the first vehicle mount so that force transferred from the coil spring to the first vehicle mount is transferred to the first vehicle mount independently of force transferred from the damper element to the first vehicle mount, and
a second vehicle mount at the second end of the coilover shock absorber and configured to attach to a second location of the vehicle different from the first location of the vehicle, the second vehicle mount physically coupled to the second damper element mount and the second end of the coil spring at separate locations of the second vehicle mount so that force transferred from the coil spring to the second vehicle mount is transferred to the second vehicle mount independently of force transferred from the damper element to the second vehicle mount.

2. A vehicle comprising the coilover shock absorber according to claim 1.

3. The vehicle according to claim 2, wherein one of the first vehicle mount or the second vehicle mount is mounted to an un-sprung part of a wheel suspension of the vehicle.

4. The coilover shock absorber according to claim 1, further comprising a springseat interposed between the coil spring and the second vehicle mount, the springseat comprising a seat for the second end of the coil spring and a springseat end distal the coil spring, the distal end of the springseat coupled to the second vehicle mount.

5. The coilover shock absorber according to claim 4, wherein the springseat is an elongated springseat having an elongated body between the seat for the second end of the coil spring and the distal end.

6. The coilover shock absorber according to claim 5, wherein the coilover shock absorber comprises at least one stabilizing element arranged between the elongated springseat and a damper cylinder of the damper element to radially stabilize the elongated springseat and such that the elongated springseat longitudinally moves independently of the damper cylinder.

7. The coilover shock absorber according to claim 1, further comprising:
a first resilient bushing, wherein the second damper element mount is coupled to the second vehicle mount through the first resilient bushing; and
a second resilient bushing, wherein the second end of the coil spring is coupled to the second vehicle mount through the second resilient bushing.

8. The coilover shock absorber according to claim 7, wherein resilient properties of the first resilient bushing differs from resilient properties of the second resilient bushing.

9. The coilover shock absorber according to claim 7, further comprising a springseat interposed between the coil spring and the second vehicle mount, the springseat comprising a seat for the second end of the coil spring and a springseat end distal the coil spring, the second resilient bushing interposed between the distal end of the springseat and the second vehicle mount and wherein the damper element extends through the springseat and the coil spring and the springseat and the coil spring are spaced apart from the damper element so that there are separate load paths from the first vehicle mount to the second vehicle mount respectively through the damper element and the coil spring.

10. The coilover shock absorber according to claim 7, further comprising:
a third resilient bushing, wherein the first damper element mount is coupled to the first vehicle mount through the third resilient bushing; and
a fourth resilient bushing, wherein the first end of the coil spring is coupled to the first vehicle mount through the fourth resilient bushing.

11. The coilover shock absorber according to claim 10, wherein the first vehicle mount and the fourth bushing are a seat for the first end of the coil spring.

12. The coilover shock absorber according to claim 11, wherein resilient properties of the third resilient bushing differs from resilient properties of the fourth resilient bushing.

13. The coilover shock absorber according to claim 1, further comprising:
a first resilient bushing, wherein the first damper element mount is coupled to the first vehicle mount through the first resilient bushing; and
a second resilient bushing, wherein the first end of the coil spring is coupled to the first vehicle mount through the second resilient bushing.

14. The coilover shock absorber according to claim 13, wherein resilient properties of the first resilient bushing differs from resilient properties of the second resilient bushing.

15. A coilover shock absorber comprising:
a damper element,
a coil spring,
a first mount for the damper element at a first end of the coilover shock absorber;
a second mount for the damper element at a second end of the coilover shock absorber,
a first seat for the coil spring at the first end of the coilover shock absorber, and
a springseat comprising a second seat for the coil spring and an end distal the coil spring, the distal end of the springseat at the second end of the coilover shock absorber,
wherein the first mount for the damper element, the first seat for the coil spring, the second mount for the damper element, and the springseat are configured so that the coil spring and the damper element independently transfer forces from the first end to the second end of the coilover shock absorber, wherein the springseat is an elongated springseat having an end proximal the coil spring, a body, and the distal end, and wherein the distal end of the elongated springseat is provided with a resilient bushing.

16. A coilover shock absorber comprising:

a damper element having a first damper element mount at a first end of the coilover shock absorber and a second damper element mount at a second end of the coilover shock absorber, a coil spring having a first end and a second end, a first vehicle mount at the first end of the coilover shock absorber and configured to attach to a first location of a vehicle, the first vehicle mount physically coupled to the first damper element mount and the first end of the coil spring, a second vehicle mount at the second end of the coilover shock absorber and configured to attach to a second location of the vehicle different from the first location of the vehicle, the second vehicle mount physically coupled to the second damper element mount and the second end of the coil spring, and a springseat interposed between the coil spring and the second vehicle mount, the springseat comprising a seat for the second end of the coil spring and a springseat end distal the coil spring, and wherein the damper element extends longitudinally through the springseat and the coil spring, and the springseat and the coil spring are each radially spaced apart from the damper element so that there are separate load paths from the first vehicle mount to the second vehicle mount respectively through the damper element and the coil spring.

17. The coilover shock absorber according to claim 16, wherein the springseat is an elongated springseat having an elongated body between the seat for the second end of the coil spring and the distal end.

18. The coilover shock absorber according to claim 17, wherein the coilover shock absorber comprises at least one stabilizing element arranged between the elongated springseat and a damper cylinder of the damper element to radially stabilize the elongated springseat and such that the elongated springseat longitudinally moves independently of the damper cylinder.

19. The coilover shock absorber according to claim 16, further comprising:

a first resilient bushing, wherein the second damper element mount is coupled to the second vehicle mount through the first resilient bushing; and a second resilient bushing, wherein the second end of the coil spring is coupled to the second vehicle mount through the second resilient bushing.

20. The coilover shock absorber according to claim 19, further comprising:

a third resilient bushing, wherein the first damper element mount is coupled to the first vehicle mount through the third resilient bushing; and a fourth resilient bushing, wherein the first end of the coil spring is coupled to the first vehicle mount through the fourth resilient bushing.

21. The coilover shock absorber according to claim 20, wherein resilient properties of the first resilient bushing differs from resilient properties of the second resilient bushing.

22. The coilover shock absorber according to claim 16, further comprising:

a first resilient bushing, wherein the first damper element mount is coupled to the first vehicle mount through the first resilient bushing; and a second resilient bushing, wherein the first end of the coil spring is coupled to the first vehicle mount through the second resilient bushing.

23. The coilover shock absorber according to claim 22, wherein resilient properties of the first resilient bushing differs from resilient properties of the second resilient bushing.

* * * * *